Patented Dec. 26, 1933

1,941,207

UNITED STATES PATENT OFFICE 1,941,207

3-CARBOXY-4-HYDROXY-DIPHENYL AND SALTS THEREOF

Adelbert W. Harvey, Pittsburgh, Pa., assignor to E. R. Squibb & Sons, Brooklyn, N. Y., a corporation of New York No Drawing. Application June 4, 1932
Serial No. 615,473

11 Claims. (Cl. 260—111)

This invention relates to 3-carboxy-4-hydroxy-diphenyl and salts thereof. It includes the new compounds and a method of preparing them.

3-carboxy-4-hydroxy-diphenyl has been found valuable as an intermediate in the preparation of various organic compounds and particularly pharmaceuticals.

It may be made by converting 4-hydroxy-diphenyl into an alkali metal phenolate and then forming the carboxy derivative by treatment with carbon dioxide under pressure at an elevated temperature, with subsequent acidification. It is important in this reaction that the phenolate be extremely dry. Although any of the alkali metal phenolates may be formed in carrying out this reaction, the sodium phenolate is preferred because it is cheaper at the present market prices, and with sodium a high yield of the 3-carboxy-4-hydroxy-diphenyl is obtained. Details of the preferred method of preparation follow:

170 grams of 4-hydroxy-diphenyl is converted into the sodium phenolate by heating to boiling with 40 grams of sodium hydroxide in 400–600 cc. of solution. The sodium phenolate may be recovered by direct evaporation over a free flame or by any other suitable method of evaporation. Care should be taken to prevent the solution or the incompletely dried mixture from absorbing any considerable quantity of carbon dioxide. Acidification with carbon dioxide breaks the phenolate down into sodium carbonate and 4-hydroxy-diphenyl. Final drying of the phenolate is carried out in vacuo, about 10 mm., at 180° C. for some time, usually 5 hours, after no more water is collected in an ice trap.

The dry pulverized phenolate is treated with carbon dioxide in an autoclave at approximately 90 pounds per square inch to form the sodium salt of 3-carboxy-4-hydroxy-diphenyl. The temperature is held at 110–120° C., for one hour, increased to 160–170° C., and held at the latter temperature for 3–4 hours. The reaction product is placed in 3000–4000 cc. of water, heated to boiling, and treated with carbon dioxide until no more 4-hydroxy-diphenyl is precipitated. It is advantageous to filter the boiled solution before treating with carbon dioxide to remove any tarry material present in the product removed from the autoclave. The suspension obtained by acidification with carbon dioxide is filtered to remove the unconverted 4-hydroxy-diphenyl and the 3-carboxy-4-hydroxy-diphenyl is then precipitated by acidifying the filtrate with mineral acid. The product is then filtered off, washed with water and dried.

The compound when purified by crystallization from alcohol occurs as fine white needles with a melting point of 212.5 to 213.5° C. (corrected). This compound is soluble in alcohol, ether, benzene, chloroform and other organic solvents.

I claim:

1. Compounds having the general formula 3-COOX 4-hydroxy diphenyl wherein X represents hydrogen or an alkali metal.

2. 3-carboxy-4-hydroxy-diphenyl.

3. The mono-sodium salt of 3-carboxy-4-hydroxy-diphenyl.

4. In the manufacture of 3-carboxy-4-hydroxy-diphenyl, the steps which comprise converting an alkali metal phenolate from 4-hydroxy-diphenyl into the alkali metal salt of 3-carboxy-4-hydroxy-diphenyl by treating the phenolate in an extremely dry condition with carbon dioxide under superatmospheric pressure and at reaction temperature.

5. In the manufacture of 3-carboxy-4-hydroxy-diphenyl, the steps which comprise converting the sodium phenolate from 4-hydroxy-diphenyl into the sodium salt of 3-carboxy-4-hydroxy-diphenyl by treating the phenolate in an extremely dry condition with carbon dioxide at a pressure of approximately one hundred pounds per square inch at a temperature in the neighborhood of 100° C. and then at a temperature in the neighborhood of 150° C.

6. In the manufacture of 3-carboxy-4-hydroxy-diphenyl, the steps which comprise converting the sodium phenolate from 4-hydroxy-diphenyl into the sodium salt of 3-carboxy-4-hydroxy-diphenyl by treating the phenolate in an extremely dry condition with carbon dioxide at a pressure of about ninety pounds per square inch, first at a temperature of about 110° to about 120° C. and then at a temperature of about 160° to about 170° C.

7. In the manufacture of 3-carboxy-4-hydroxy-diphenyl, the steps which comprise converting the sodium phenolate from 4-hydroxy-diphenyl into the sodium salt of 3-carboxy-4-hydroxy-diphenyl by treating the phenolate in an extremely dry condition with carbon dioxide under a pressure of about one hundred pounds per square inch at reaction temperature.

8. The method of preparing 3-carboxy-4-hydroxy-diphenyl which comprises converting 4-hydroxy-diphenyl into the sodium phenolate, drying the sodium phenolate, converting it to the sodium carboxy-derivative of 4-hydroxy-diphenyl by treatment with carbon dioxide and then acidifying the product.

9. The method of preparing 3-carboxy-4-hydroxy-diphenyl which comprises converting 4-hydroxy-diphenyl into the sodium phenolate, drying the product, treating the dried pulverized phenolate with carbon dioxide at reaction temperature and under superatmospheric pressure to form the sodium carboxy-derivative of 4-hydroxy-diphenyl, separating hydroxy-diphenyl from the product by heating in water and treating with carbon dioxide, and then precipitating the 3-carboxy-4-hydroxy-diphenyl by acidification with a mineral acid.

10. The method of separating 4-hydroxy-diphenyl from 3 - carboxy - 4 - hydroxy - diphenyl which comprises acidifying an aqueous solution of the alkali-metal phenolate of the former and the alkali-metal salt of the latter with carbon dioxide so as to precipitate the 4-hydroxy-diphenyl.

11. As a new compound, a 5-phenylsalicylic compound having the general formula,

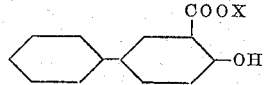

wherein X represents hydrogen or a metal radical.

ADELBERT W. HARVEY.